Oct. 10, 1967 H. M. STRONG 3,346,102
GRAPHITE-CATALYST CHARGE ELEMENT FOR THE PREPARATION OF DIAMOND
Filed July 31, 1964 2 Sheets-Sheet 1
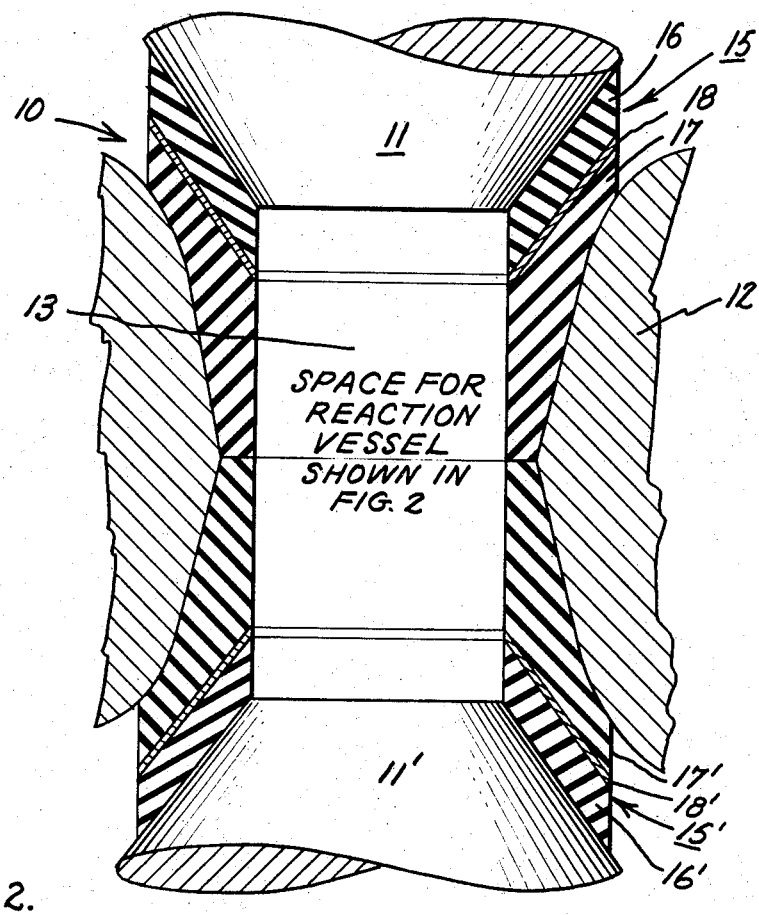
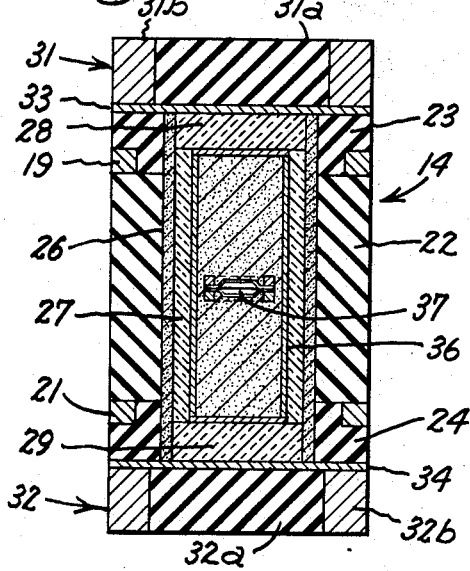
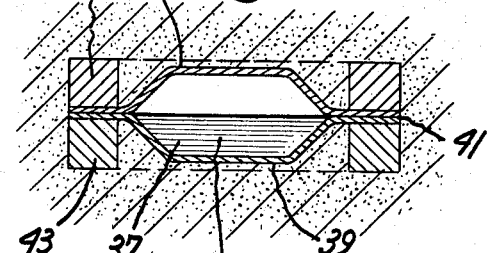
Inventor:
Herbert M. Strong,
by Leo J. MaLossi
His Attorney.

Oct. 10, 1967  H. M. STRONG  3,346,102
GRAPHITE-CATALYST CHARGE ELEMENT FOR THE PREPARATION OF DIAMOND
Filed July 31, 1964 2 Sheets-Sheet 2
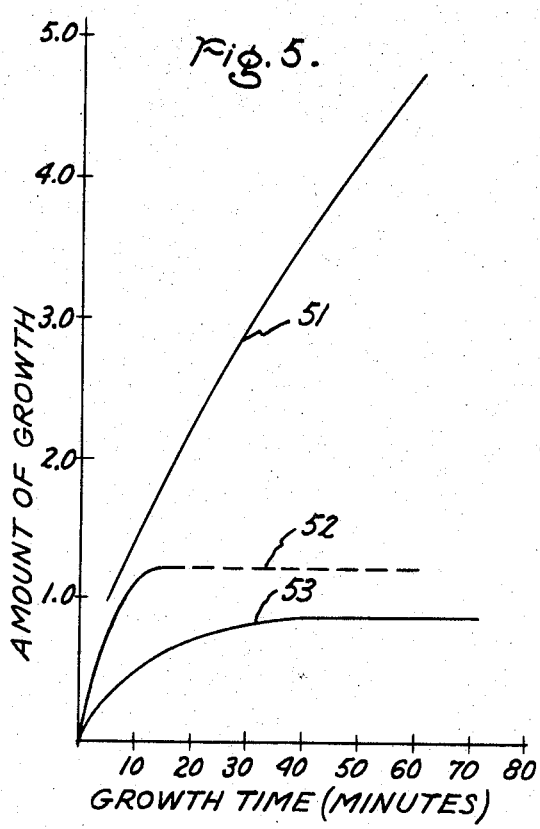
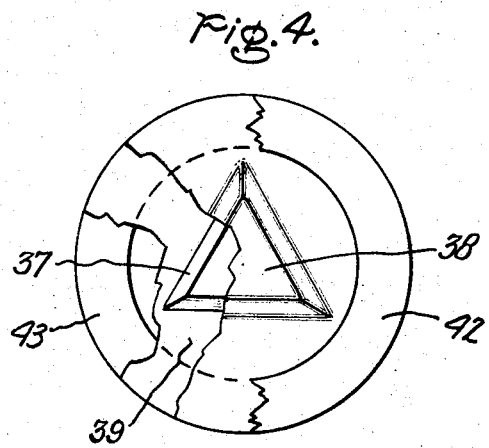
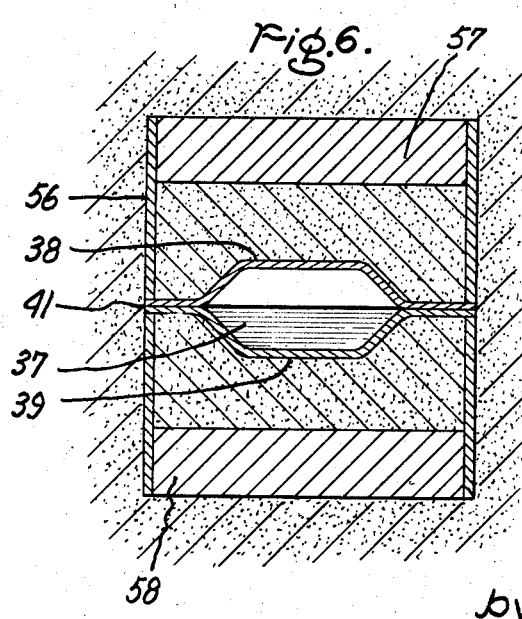
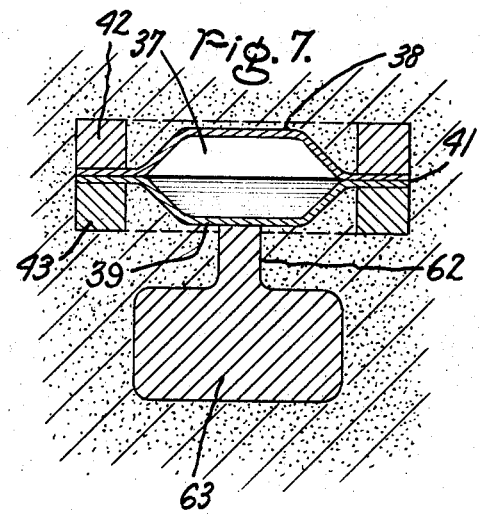
Inventor:
Herbert M. Strong,
by Leo S. McLoui
His Attorney.

United States Patent Office 3,346,102
Patented Oct. 10, 1967

3,346,102
GRAPHITE-CATALYST CHARGE ELEMENT FOR THE PREPARATION OF DIAMOND
Herbert M. Strong, Schenectady, N.Y., assignor to General Electric Company, a corporation of New York
Filed July 31, 1964, Ser. No. 386,636
7 Claims. (Cl. 206—47)

ABSTRACT OF THE DISCLOSURE

A graphite-catalyst charge element configuration for the production of diamond growth on seed diamonds is described wherein a diamond seed crystal covered with a thin layer of catalyst metal is embedded in graphite and a reservoir of catalyst metal is also located in the graphite at least ½ mm. distant from the seed diamond with a thin catalyst layer extending through the intervening graphite to interconnect the catalyst-covered diamond and the catalyst reservoir. In addition, a second graphite-catalyst charge element configuration is disclosed wherein in addition to the component arrangement already described a quantity of a metal that will form an alloy with the catalyst metal being employed is provided, the quantity of alloying metal being spaced from the catalyst metal covering for the seed diamond and being connected thereto by a neck of alloying metal.

---

This invention relates to diamond growth by the catalytic process, and more particularly to a method and apparatus for producing increased rate and improved quality of diamond growth.

The conversion of carbonaceous material (usually graphite) to diamond under the action of high pressures and high temperatures in the presence of a catalyst may be conducted in a variety of apparatuses at various temperatures and pressures within reasonably well-defined ranges employing various catalyst systems with or without a "seed crystal." It has been a constant aim to enable the commercial production of strong individual diamond crystals of good quality and of a size enabling the mounting of such individual crystals in various tool matrices for use in cutting and grinding applications.

To this end it has been discovered that the manner in which the catalyst metal is made available to the diamond reaction is a very important factor in increasing both the rate of and extent of diamond growth and in improving the quality of the resultant growth.

Accordingly, it is an object of this invention to provide means in a high pressure reaction cell to insure circulation of metal catalyst around a growing seed crystal in the catalytic promotion of diamond growth.

It is another object of this invention to arrange the source of catalyst metal in the reaction cell configuration in the catalytic growth of diamond in such a manner as to greatly increase the rate and length of the period of growth of diamond material upon a diamond seed crystal.

It is a further object of this invention to provide a reaction cell configuration wherein both a source and a sink for the catalyst metal are provided whereby catalyst metal being transported from the source to the sink will flow over the surface of the diamond seed located therebetween before passing to the sink.

It is still a further object of this invention to provide an improved arrangement of reactants and catalyst materials in the reaction vessel of a high pressure apparatus to implement greater diamond growth by promoting the rapid transport of fresh catalyst metal to and over the surface of a seed crystal to promote the delivery of carbon atoms to the diamond and to prevent the accumulation of catalyst poison materials on the surface of the seed diamond.

Briefly described this invention includes the provision of a comparatively large source of catalyst spaced from but in communication with the diamond surface and optionally a relatively large mass of a sink metal with which the catalyst metal will form some alloy composition, the concentration of sink metal being in contact with the seed crystal or with a thin catalyst layer in contact therewith over a very small area to provide a path of travel for the catalyst metal leaving the diamond surface and passing to the sink.

This invention will be better understood when considered in connection with the following description and the drawings in which:

FIG. 1 is an elevational view in section of a preferred superpressure apparatus wherein the process of this invention may be carried out;

FIG. 2 is a vertical cross-section of one embodiment of a reaction cell to be employed in the apparatus of FIG. 1 in the practice of this invention;

FIG. 3 is an enlarged sectional view showing the preferred arrangement of those components of the reaction cell shown in FIG. 2, which promote the circulation of catalyst metal over the surface of the seed diamond;

FIG. 4 is a plan view partially cut away of the assembly of components shown in FIG. 3;

FIG. 5 is a graphic representation displaying the beneficial effect upon the rate and extent of diamond growth on a diamond seed crystal by employing the teachings of this invention;

FIG. 6 is an enlarged sectional view of a second arrangement of the components of a reaction cell to provide continuous circulatory replenishment of the catalyst metal to the diamond seed crystal; and FIG. 7 is an enlarged sectional view showing a third arrangement of the components of a reaction cell wherein in addition to providing a continuous flow of catalyst to the diamond seed crystal, a sink is provided to encourage transport of catalyst from the surface of the diamond seed.

A suitable process for the conversion of non-carbon diamond to diamonds is outlined in U.S. Patents 2,947,-610—Hall et al. and 2,947,609—Strong. Briefly, the process includes combining a suitable non-diamond carbonaceous material, usually graphite, together with a catalyst metal comprising at least one of the metals of Group VIII of the periodic table of elements, chromium, manganese or tantalum. The graphite-catalyst combination is then subjected to pressures and temperatures which are above the graphite-to-diamond equilibrium (Berman-Simon) line on the phase diagram of carbon, and in the range where the particular catalyst is effective to provide transformation or conversion of graphite to diamond.

One preferred form of a high pressure, high temperature apparatus in which the diamond growth process of this invention may be practiced is the subject of U.S. Patent 2,941,248—Hall, this apparatus being schematically illustrated in FIG. 1 herein. Thus, as shown in FIG. 1, apparatus 10 includes a pair of punches 11 and 11' and an intermediate "belt" or die 12. Each punch is surrounded by a plurality of press-fitted binding rings (not shown) which reinforce the punches, and a soft steel outer safety ring (not shown. Die member 12 encloses an aperture 13 in which there is positioned a charge element, reaction vessel 14. Between each punch 11 and 11' and die 12, there are included gasket assemblies 15 and 15', respectively to completely surround and receive vessel 14. Each gasket assembly, for example assembly 15, comprises a pair of conical pyrophyllite gaskets such as 16 and 17 with the conical metallic gasket 18 interposed therebetween.

Motion of either one of punches 11 and 11' towards the other will compress the gasket assemblies 15 and 15' and thereafter will compress the reaction vessel 14 disposed therebetween raising the pressure in the specimen in reaction vessel 14 to a very high value. At the same time, electrical current is provided from a source, not shown, to flow via punch 11 and 11' through a suitable resistance heater (to be described below) in the reaction vessel 14 for optional heating of the specimen.

Reaction vessel 14 is of the general type disclosed in U.S. Patent 3,030,662—Strong modified by the addition of steel retaining rings 19 and 21. This reaction cell, or sample holder, 14 makes use of the improved pressure transmitting qualities of sodium chloride in that the sodium chloride crystals slip easier relative to each other than do pyrophyllite crystals and the sodium chloride volume increases upon melting at high pressures and high temperatures, unlike pyrophyllite, thereby further increasing or at least stabilizing cell pressure.

Thus, in the reaction vessel 14 of FIG. 2 the outer centrally located cylinder 22 is composed of sodium chloride. Positioned concentrically with cylinder 22 at each end thereof are annular rings 23 and 24 composed of pyrophyllite or soap stone. The steel retaining rings 19 and 21 fit into an appropriately dimensioned recess in pyrophyllite caps 23 and 24 as shown. Positioned concentrically within and adjacent to cylinder 22 is graphite electrical resistance heater tube 26. Within graphite tube 26 there is concentrically positioned alumina liner, or cylinder 27. Opposite ends of liner 27 are fitted with a pair of alumina plugs 28, 29 effectively closing the ends of alumina tube 27. Heating current is provided to graphite heater tube 26 via end cap assemblies 31, 32 and electrically conductive metallic end discs 33, 34. End cap assemblies 31, 32 are composed of pyrophyllite plugs 31a, 32a surrounded by electrically conducting rings 31b, 32b.

Fitted within alumina liner 27 and bounded at the top and bottom by alumina plugs 28, 29 is the graphite-lined tantalum capsule 36 having closed ends. The charge, which may be located within capsule 36, is shown in greater detail in FIGS. 3, 4, 6 and 7.

With respect to the first (preferred) arrangement comprising this invention as illustrated in FIGS. 3 and 4, seed diamond 37 (in this instance a shape of diamond known as a "macle") is enclosed by thin foil discs 38, 39 between which it is placed the discs being creased around it and is connected via a connecting layer, rim portions 41 of discs 38, 39 placed together as shown, to a relatively massive catalyst reservoir from which seed 37 can draw catalyst metal during the growing stage. The catalyst reservoir shown in FIG. 3 comprises two rings 42, 43 of catalyst metal within which is disposed the metal-covered seed diamond 37. The assembly comprising seed 37, discs 38, 39 and rings 42, 43 is embedded in graphite which occupies the balance of the space within capsule 36.

In one experiment employing the arrangement illustrated in FIG. 3, the foil discs 38, 39 covering the seed crystal 37 were each 0.0005 in. thick and weighed about 0.005 gram. Rings 42 and 43 were each 0.020" thick and approximately 0.225" outside diameter and 0.175" inside diameter. Total weight of the catalyst rings was about 0.115 gram. Discs 38, 39 and rings 42, 43 were all made of nickel. After assembly of its various components, reaction vessel 14 was introduced into the superpressure apparatus 10 being properly disposed in space 13 together with gasket assemblies 15, 15' and there was subjected to pressure in the cell in the diamond stable region of the phase diagram of carbon to a pressure in excess of about 50 kilobars (1 kb.=987 atm.) and a temperature in the range from about 1350° C. to about 1450° C. Under these conditions the deposition of diamond growth on diamond seed 37 began and proceeded. As additional nickel was required to continue the growth process, this catalyst metal flowed to the seed 37 from the liquefied nickel rings 42 and 43 via the conduit provided by rim 41. As the diamond grew and reached the rings 42 and 43 it was then able to receive the requisite catalyst directly therefrom. Growth on the diamond seed 37 proceeded rapidly and continuously for periods of time of at least an hour in duration with no indication of cessation or slowing down of the growth.

In those experiments in which the catalyst reservoir (rings 42 and 43 in the embodiment in FIG. 3) were not provided, the original nickel discs 38, 39 (0.0005 in. thick) disappeared after between 5 and 10 minutes of growth time and growth of the seed 37 ceased abruptly.

In those instances in which an attempt was made to compensate for the lack of catalyst reservoir by starting the diamond seed crystal growth using thicker nickel foil discs (0.005 in. thick) to cover the seed diamond 37, quite a different behavior was experienced. In all instances, the growth proceeded very slowly after the proper pressure and temperature conditions were achieved and slowed down and stopped after about 20 to 30 minutes, with the nickel film only partially consumed.

The different behaviour patterns described above are illustrated graphically in FIG. 5. The growth time in minutes is set forth along the abscissa of the graph and the pertinent ordinate values represent the weight quantities of growth upon the seed diamond 37 expressed in terms of a standard amount of good quality growth. As a standard, the value of unity represents the maximum amount of growth obtained by placing large diamond seed crystals within a graphite-catalyst mixture in a reaction cell and exposing the reaction cell to graphite-to-diamond conversion conditions. Thus, the value 1.0 is the standard amount of growth (about 0.2 mm. thickness over the entire surface of the seed) obtained in one such run regardless of time of exposure. In the practice of this invention, if a growth of two times as much diamond occurs upon the seed crystal as constitutes the standard amount of growth in one run, the ordinate used in plotting this value has a value of 2.0, etc. Curve 51 illustrates the very rapid rate of growth and the large amount of growth actually obtained in the practice of this invention in experiments employing the arrangement shown in FIG. 3. In contrast thereto, curve 52 represents the growth behavior using isolated 0.0005 in. thick nickel discs (without catalyst reservoir) wherein the growth reached a maximum value of about 1.1 to 1.2 in about 10 minutes after which all growth ceased. Curve 53 represents the behaviour of the growth pattern when isolated 0.005 in. thick nickel discs (without catalyst reservoir) were employed. As shown, the diamond growth reached a maximum value of between about 0.5 and 0.8 over a period of about 20 minutes after which the rate slowed down and substantially stopped. In contrast to curves 52 and 53, curve 51 wherein the reservoir of nickel was employed reached a growth value of 4.75 in 60 minutes with no indication that the growth rate would level off or stop.

The pressures and temperatures used in all the tests represented by the data graphically recorded in FIG. 5 were the same to within small errors and the contrast in the results as shown by curves 51, 52 and 53 clearly indicates the value of using the thin foil catalyst sheet in connection with the catalyst reservoir to obtain a prolonged growth time and rapid growth rate.

The ratio of catalyst metal to seed diamond should be in the range of from about 30 to 1 to about 100 to 1 (by weight). The thickness of the catalyst discs 38, 39 may vary between ½ mil and about 10 mils while the rim 41 should have a thickness ranging between about 8 mills and 30 mils. Thus, when discs thinner than 4 mils are employed, an additional thickness of catalyst metal should be interposed between these discs in the rim area in order to increase the thickness of the rim to about 8 mils. At least about 8 mils of rim thickness is preferred due to the fact that during diamond growth, graphite growth also appears extending out into the molten catalyst film a distance as great as from 2 to 5 mils. If this graphite growth were allowed to extend across the catalyst stream or film, the flow of catalyst metal to the surface of the growing diamond would be cut off stopping all growth.

In order that diamond growth can get started before the growing diamond seed comes into contact with the catalyst reservoir (rings 42, 43), there should be a minimum of ½ millimeter of rim distance between the diamond surface and the catalyst reservoir. However, there is no particular maximum with respect to this distance although, because of the limitations in reaction cell size, there is a practical maximum of about ½ centimeter. The flow of catalyst metal, which amounts to a circulation effect occurs, because as the diamond grows, more diamond surface area comes into existence and there is an increased need for catalyst metal. This demand sets up a flow of the catalyst metal, which is in the fluid state, and although this flow is small, it is important.

The limitations on pressure and temperature are such that the operation must be conducted in the diamond stable region close to the equilibrium line for the catalyst employed so that for any given temperature, the pressure will have a value of not greater than about 2 kilobars above the equilibrium pressure for that given temperature.

In locating the assembly (diamond seed, catalyst discs and reservoir) the assembly should be placed in the reaction cell 1 at a location in which the temperature field is uniform. Generally in most cell configurations this location will be in the middle third of the cell. Although elements 27, 28, 29 and 36 are of alumina and tantalum respectively these elements could have been made of pure sodium chloride salt.

Even though at the operating conditions of pressure and temperature the catalyst metal is liquefied, the communicating channel between the surface of seed 37 and the reservoir of catalyst metal is not closed up, because of the facts that graphite does not flow readily, remains solid and supports the pressure gradient within the sample.

Although the constructions set forth in the drawings show the diamond seed covered both top and bottom by the catalyst foil the invention will operate simply by placing the diamond in contact with a single disc with the disc in contact with the catalyst reservoir. When the catalyst metal is liquefied, it proceeds to flow from the reservoir to the diamond and all over the surface of the diamond seed so long as the assembly is arranged with the diamond seed in contact with the catalyst metal disc. However, if only a single disc is employed the growth of diamond is unsymmetrical, i.e., more growth occurs on the face not in contact with the catalyst metal.

Metal catalysts usable in the practice of this invention are those catalysts metals or alloys thereof, which do not form solid carbides. Among these catalysts are nickel and alloys of nickel such as the nickel-iron alloy, nickel-vanadium, nickel-niobium, nickel-molybdenum, nickel-copper alloys, etc.

Various configurations for the catalyst reservoir may be employed. Another such arrangement is illustrated in FIG. 6 wherein seed crystal 37 is wrapped in catalyst foil discs 38, 39 and rim 41 extends to a thin, nickel cylindrical tube 56 (about 0.010 to 0.040 in. thick), which in turn is in contact with relatively thick nickel discs 57, 58. This entire assembly is embedded in graphite similar to the above-described arrangement in connection with the disposition of elements within capsule 36.

One additional general arrangement is shown in FIG. 7. This arrangement differs from those in FIGS. 3, 4 and 6 in that in addition to providing a substantial reservoir, or source, of catalyst metal from which flow will occur across the surface of the diamond seed 37, a sink for the catalyst metal is also provided with the source and sink being arranged relative to each other so that catalyst metal flowing from the reservoir to the sink must first pass over the diamond seed 37. In the arrangement shown, the source of catalyst metal is substantially the same as in the arrangement shown in FIG. 3 and a neck 62 of metal protrudes from the sink 63 into contact with the underside of the foil disc 39 over a small area thereof. Sink 63 may be a solid piece of metal, a powdered mass or a bundle of wires with the latter two configurations providing larger alloying surface for the catalyst metal. The nature of the metal composing the sink is such that the catalyst will form an alloy with it and will therefore attract catalyst metal to it from the surface of the diamond. Metals which are most suitable as sink material are tantalum, titanium, niobium, vanadium, tungsten, molybdenum, manganese, iron, rhodium, palladium, copper, gold and tin.

The explanation for the new growth behavior is complex in that many factors probably contribute thereto. As one aspect, when the seed crystal 37 is placed in communication with but out of contact with a large reservoir of fluid catalyst under the growth conditions of pressure and temperature, it is possible that an improved pressure transmission is obtained through the fluid catalyst because the fluid catalyst acting as a hydraulic fluid will flow into any space newly vacated by graphite, which has been converted to diamond, which is a more dense form of carbon. In this manner, a constant pressure is maintained contributing strongly to increased diamond growth.

Another factor is that as fresh catalyst metal is brought to the diamond a small convection current is stimulated which promotes the speed of delivery of carbon atoms to the diamond surface. And a further factor, particularly applicable to the arrangement shown in FIG. 7, is that poisoning of the catalyst film is minimized by the sweeping action of the fresh catalyst supply over the diamond, which will either dilute the poison or sweep it away from the diamond surface, particularly under the influence of the presence of a sink.

The following is a series of experiments conducted employing various arrangements for the catalyst reservoir, diamond crystal and connecting catalyst transporting path:

EXPERIMENT 1

The arrangement shown in FIG. 3 was employed using two 0.0005" nickel foil discs to cover a macle diamond weighing 17.1 mgm. The weight of the nickel foils was 5 mgm. and about 115 mgm. of nickel was employed as the reservoir rings 42, 43 of FIG. 3. The time of the run was 20 minutes using a pressure of about 54 kilobars and a temperature of 1400° C. The amount of growth generated was the equivalent of 2.4 standard runs increasing the weight of the seed diamond to 34.1 mgm.

EXPERIMENT 2

The arrangement shown in FIG. 2 was employed using a macle diamond weighing 14.1 mgm. Two discs of 0.0001" nickel foil weighing .5 mgm. were used to cover the seed diamond. The nickel reservoir rings weighed 115 mgm. The pressure was about 54 kilobars and the temperature was about 1420° C. After 40 minutes the amount of growth generated was 3.5 standard runs and the seed diamond had increased to a weight of 38.5 mgm.

EXPERIMENT 3

Approximately the same arrangement was employed in this experiment as in Experiment 1 above, including the temperature and pressure conditions. After 60 minutes of operation the amount of growth generated on the macle seed diamond was equal to 4.75 standard runs and the seed diamond increased in weight from 4.3 to 27.4 mgm.

EXPERIMENT 4

In this experiment a 3.7 mgm. octahedron diamond seed was placed on the center of a 0.005" disc of nickel. The diamond was encircled by a ring of nickel 0.010" thick having an outside diameter equal to the outside diameter of the disc (0.221" O.D.) and with an inner diameter of 0.080". A second nickel ring having the same thickness and O.D. as the former ring but having a 0.100" I.D. was placed on top of the first disc. The diamond was not in contact with either of the rings. The pressure employed was between 54 and 55 kilobars; the temperature was about 1425° C. After a period of 120 minutes diamond growth the equivalent of three standard runs was obtained increasing the outside of the octahedron diamond from 3.7 to 22 mgm.

EXPERIMENT 5

In this experiment the arrangement of components was the same as in Experiment 4, except that instead of having 0.080" and 0.100" inside diameters respectively for the rings, the diameters were 0.100" and 0.150", respectively, to accommodate a larger seed diamond. The operating conditions were approximately the same as in Experiment 4 and after 140 minutes the diamond growth amounted to 2.5 standard runs; that is, a 22 mgm. octahedron diamond was increased in weight to 61 mgm.

EXPERIMENT 6

The arrangement of parts was approximately the same as in Experiment 4, except that only a single nickel ring reservoir was employed. An octahedron diamond weighing 4.1 mgm. was placed on the center of a 0.221" O.D. disc having a thickness of 0.010". The diamond was encircled by a nickel ring 0.010" thick having a 0.221" O.D. and 0.150" I.D. As in all cases there was no direct contact of the diamond with the nickel reservoir and the operating conditions of pressure and temperature were the same as in Experiment 5. After 120 minutes the diamond growth was the equivalent of 2.4 standard runs and the octahedron was increased in weight to 17.8.

EXPERIMENT 7

The arrangement employed in this experiment was similar to the construction shown in FIG. 6. A cubo-octahedron seed diamond was placed on a nickel disc 0.010" thick without using a second covering disc for the diamond. The disc and seed diamond were placed in a nickel tube having 0.225" O.D. and a length of 0.260". The portions of the catalyst reservoir analogous to elements 57 and 58 in FIG. 6 were 0.005" thick. The nickel disc supporting the seed diamond weighed 59 mgm. and the rest of the nickel reservoir had a weight of 129 mgm. Employing the same temperature and pressure conditions as in Experiment 5, after 25 minutes the cubo-octahedron had increased in size from 0.3 x 0.5 mm. to 1.0 x 0.90 mm.

Therefore, by employing the arrangements and techniques described herein, it is now possible to produce diamond growth far in excess of that produced by methods and constructions known heretofore.

Obviously many modifications and variations of the invention as illustrated herein are possible in the light of the above teachings. It is, therefore, to be understood that within the scope of the appended claims, the invention may be practiced otherwise than as specifically described.

What I claim as new and desire to secure by Letters Patent of the United States is:

1. In a graphite-catalyst charge element arrangement for insertion in high pressure apparatus for the conversion of graphite to diamond by application thereto of high pressures and high temperatures above the graphite-to-diamond equilibrium line on the phase diagram of carbon wherein a seed diamond crystal is enveloped in a quantity of graphite which in turn is enclosed in a pressure-transmitting layer for preventing contamination of the charge, the improvement which comprises:
   (a) a mass of metal forming a catalyst reservoir located in said quantity of graphite at a distance of at least about ½ millimeter from the seed diamond being separated therefrom by graphite,
      (1) said metal being a catalyst for the graphite-to-diamond conversion characterized by not forming a solid carbide under graphite-to-diamond conversion conditions of pressure and temperature, and
   (b) a layer of a catalyst metal as described herein connecting said catalyst reservoir with the surface of said seed diamond,
      (1) said layer having a small volume per unit area relative to the volume per unit of area of said catalyst reservoir.

2. A graphite-catalyst charge element substantially as recited in claim 1 wherein the metal of the catalyst reservoir and the connecting layer are nickel, the thickness of said connecting layer is smaller than about 30 mils and the ratio of nickel to seed diamond is in the range of from about 30 to 1 to about 100 to 1 by weight.

3. In a graphite-catalyst charge element arrangement for insertion in high pressure apparatus for the conversion of graphite to diamond by application thereto of high pressures and high temperatures above the graphite-to-diamond equilibrium line on the phase diagram of carbon wherein a seed diamond crystal is enveloped in a quantity of graphite which in turn is enclosed in a pressure-transmitting layer for preventing contamination of the charge, the improvement which comprises:
   (a) a mass of metal forming a catalyst reservoir located in said quantity of graphite at a distance of at least about ½ millimeter from the seed diamond being separated therefrom by graphite,
      (1) said metal being a catalyst for the graphite-to-diamond conversion characterized by not forming a solid carbide under graphite-to-diamond conversion conditions of pressure and temperature,
   (b) a layer of a catalyst metal as described herein connecting said catalyst reservoir with the surface of said seed diamond,
      (1) said layer having a small volume per unit area relative to the volume per unit of area of said catalyst reservoir, and
   (c) a mass of a second metal located at a distance from the seed diamond being separated therefrom and from the metal of said catalyst reservoir by graphite,
      (1) said second metal readily forming an alloy with the metal of said catalyst reservoir and being connected to a small portion of the surface of said seed diamond by a connected neck of said second metal.

4. A graphite-catalyst charge element substantially as recited in claim 3 wherein the metal of the catalyst reservoir and the connecting layer are nickel, the thickness of said connecting layer is smaller than about 30 mils and the ratio of nickel to seed diamond is in the range of from about 30 to 1 to about 100 to 1 by weight.

5. A graphite catalyst charge element substantially as recited in claim 1 wherein the bulk of the metal of the catalyst reservoir is present in the shape of at least one ring which encircles but does not contact the seed diamond.

6. A graphite catalyst charge element substantially as recited in claim 3 wherein the bulk of the metal of the catalyst reservoir is present in the shape of at least one ring which encircles but does not contact the seed diamond.

7. In a graphite-catalyst charge element arrangement for insertion in high pressure apparatus for the conversion of graphite to diamond by application thereto of high pressures and high temperatures above the graphite-to-diamond equilibrium line on the phase diagram of carbon wherein a seed diamond crystal is enveloped in a quantity of graphite which in turn is enclosed in a pressure-transmitting layer for preventing contamination of the charge, the improvement which comprises:
 (a) a mass of metal forming a catalyst reservoir located in said quantity of graphite at a distance of at least about ½ millimeter from the seed diamond being separated therefrom by graphite,
  (1) said metal being a catalyst for the graphite-to-diamond conversion characterized by not forming a solid carbide under graphite-to-diamond conversion conditions of pressure and temperature, and
 (b) a layer of a catalyst metal as described herein connecting said catalyst reservoir with the surface of said seed diamond,
  (1) said layer having a thickness substantially less than the thickness of said catalyst reservoir.

References Cited

UNITED STATES PATENTS 3,142,595  7/1964  Wentorf _____ 23—209.1 X

OTHER REFERENCES

Bundy "Jr. Chemical Physics" vol. 35, No. 2, August 1961, pp. 383–391.

OSCAR R. VERTIZ, *Primary Examiner.*

E. J. MEROS, *Examiner.*